US012715270B2

(12) United States Patent
Richardson

(10) Patent No.: US 12,715,270 B2
(45) Date of Patent: Aug. 25, 2026

(54) VEHICLE CABIN DEHUMIDIFICATION AT LOW AMBIENT TEMPERATURES

(71) Applicant: GM GLOBAL TECHNOLOGY OPERATIONS LLC, Detroit, MI (US)

(72) Inventor: Devin C. Richardson, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 336 days.

(21) Appl. No.: 18/359,165

(22) Filed: Jul. 26, 2023

(65) Prior Publication Data

US 2025/0033438 A1 Jan. 30, 2025

(51) Int. Cl.

| | |
|---|---|
| ***B60H 3/02*** | (2006.01) |
| ***B60H 1/00*** | (2006.01) |
| ***B60H 1/32*** | (2006.01) |

(52) U.S. Cl.

CPC ......... *B60H 3/024* (2013.01); *B60H 1/00278* (2013.01); *B60H 1/00785* (2013.01); *B60H 1/00849* (2013.01); *B60H 1/3233* (2013.01); *B60H 2001/00307* (2013.01)

(58) Field of Classification Search

CPC ............ B60H 1/00278; B60H 1/00785; B60H 1/008749; B60H 1/00849; B60H 1/3233; B60H 1/00921

See application file for complete search history.

(56) References Cited

U.S. PATENT DOCUMENTS

| | | | | |
|---|---|---|---|---|
| 6,067,808 | A * | 5/2000 | Dage | B60H 1/3207 454/75 |
| 11,077,736 | B2 * | 8/2021 | Ishizeki | F25B 6/04 |
| 2012/0248205 | A1 * | 10/2012 | Klinkhammer | B60H 1/00685 454/143 |
| 2014/0026600 | A1 * | 1/2014 | Wippler | B60H 1/00785 62/151 |
| 2015/0122472 | A1 * | 5/2015 | Higuchi | F25B 49/022 165/202 |
| 2016/0116197 | A1 * | 4/2016 | Takeuchi | F25B 27/02 62/278 |
| 2017/0355247 | A1 * | 12/2017 | Seki | B60H 1/323 |
| 2019/0193517 | A1 * | 6/2019 | Kobayashi | B60H 1/00835 |

(Continued)

FOREIGN PATENT DOCUMENTS

| | | | |
|---|---|---|---|
| DE | 102007007215 | A1 | 8/2008 |
| DE | 102009019128 | A1 | 11/2010 |

(Continued)

OTHER PUBLICATIONS

German Office Action for German Application No. 102023128154.2; dated Apr. 11, 2024; 7 pages.

*Primary Examiner* — Nelson J Nieves
(74) *Attorney, Agent, or Firm* — CANTOR COLBURN LLP

(57) ABSTRACT

A method of operating a heating, ventilation and air conditioning (HVAC) system of a vehicle includes operating the HVAC system in a heating mode to heat a supply airflow and direct the heated supply airflow into a passenger compartment of the vehicle; and selectably directing a flow of refrigerant through an evaporator of the HVAC system to reduce a relative humidity of the supply airflow by condensing excess moisture out of the supply airflow at the evaporator.

14 Claims, 5 Drawing Sheets

(56) References Cited

U.S. PATENT DOCUMENTS

| | | | | |
|---|---|---|---|---|
| 2021/0129626 | A1* | 5/2021 | Peard | B60H 1/3213 |
| 2022/0185067 | A1* | 6/2022 | Kim | B60H 1/00278 |
| 2023/0137140 | A1* | 5/2023 | Yamashita | B60H 1/0073<br>62/244 |
| 2023/0373272 | A1* | 11/2023 | Hötzel | B60H 1/00485 |
| 2024/0034123 | A1* | 2/2024 | Kim | B60H 1/00278 |
| 2024/0157756 | A1* | 5/2024 | Miyakoshi | B60H 1/00921 |
| 2024/0174053 | A1* | 5/2024 | Kim | B60H 1/00921 |
| 2024/0262166 | A1* | 8/2024 | Kim | B60H 1/00921 |
| 2025/0135843 | A1* | 5/2025 | Lee | B60H 1/32 |
| 2025/0249728 | A1* | 8/2025 | Akiki | B60H 1/323 |

FOREIGN PATENT DOCUMENTS

| | | | |
|---|---|---|---|
| DE | 102012021234 | A1 | 4/2014 |
| DE | 102020127300 | A1 | 4/2022 |

* cited by examiner

VEHICLE CABIN DEHUMIDIFICATION AT LOW AMBIENT TEMPERATURES

The subject disclosure relates to vehicle heating, ventilation and air conditioning (HVAC) systems, and in particular to operation of such systems at low ambient temperatures, such as ambient temperatures below 40 degrees fahrenheit.

In cold conditions, heating the vehicle cabin utilizing recirculated air mode of the HVAC system is typically more efficient than heating the vehicle cabin with fresh air mode. Such an increase in efficiency improves vehicle range, especially range of an electric vehicle. In typical recirculated air mode, the air in the vehicle cabin is filtered and recycled through the vehicle cabin indefinitely. This tends to increase the relative humidity of the air in the vehicle cabin, due to moisture from the passengers and other items such as food and drink to build up in the vehicle cabin. This increase in relative humidity increases the occurrence of fogging on inside surfaces of the vehicle windows.

SUMMARY

In one exemplary embodiment, a method of operating a heating, ventilation and air conditioning (HVAC) system of a vehicle includes operating the HVAC system in a heating mode to heat a supply airflow and direct the heated supply airflow into a passenger compartment of the vehicle; and selectably directing a flow of refrigerant through an evaporator of the HVAC system to reduce a relative humidity of the supply airflow by condensing excess moisture out of the supply airflow at the evaporator.

In addition to one or more of the features described herein the supply airflow is recirculated airflow from the passenger compartment.

In addition to one or more of the features described herein accumulated moisture is removed from the evaporator by opening a fresh air duct to admit ambient air as a portion of the supply airflow, and stopping the flow of refrigerant through the evaporator.

In addition to one or more of the features described herein operation of the evaporator is controlled to maintain an evaporator superheat greater than zero.

In addition to one or more of the features described herein monitoring the relative humidity and passenger compartment temperature are monitored via a humidity sensor.

In addition to one or more of the features described herein the flow of refrigerant through the evaporator is stopped when the relative humidity is below a selected threshold.

In addition to one or more of the features described herein an ambient temperature outside of the vehicle is less than 40 degrees fahrenheit.

In addition to one or more of the features described herein a dew point of the supply airflow is greater than zero degrees Celsius.

In another exemplary embodiment, a heating, ventilation and air conditioning (HVAC) system of a vehicle includes a refrigerant circuit including a compressor to urge a flow of refrigerant through the refrigerant circuit, a condenser heater, and an evaporator. One or more supply airflow inlets are configured to direct a supply airflow across one or more of the condenser heater and the evaporator, and one or more outlet ducts are configured to direct the supply airflow to a passenger compartment of the vehicle. An HVAC system controller is configured to operate the HVAC system in a heating mode to heat the supply airflow by directing the supply airflow across the condenser heater, and direct the heated supply airflow into the passenger compartment of the vehicle. A flow of refrigerant is selectably directed through the evaporator to reduce a relative humidity of the supply airflow by condensing excess moisture out of the supply airflow at the evaporator.

In addition to one or more of the features described herein the supply airflow is recirculated airflow from the passenger compartment.

In addition to one or more of the features described herein the HVAC system controller is further configured to open a fresh air duct to admit ambient air as a portion of the supply airflow, thereby removing accumulated moisture from the evaporator.

In addition to one or more of the features described herein the HVAC system controller is further configured to control operation of the evaporator to maintain an evaporator superheat greater than zero.

In addition to one or more of the features described herein the HVAC system controller is further configured to stop directing the flow of refrigerant through the evaporator when the relative humidity is below a selected threshold.

In addition to one or more of the features described herein a blower is configured to urge the supply airflow through the HVAC system.

In addition to one or more of the features described herein a coolant circuit has a flow of coolant therethrough and is thermally connected to the refrigerant circuit via a chiller.

In addition to one or more of the features described herein the flow of coolant is configured to cool a rechargeable energy storage system of the vehicle.

In another exemplary embodiment, a vehicle includes a vehicle body defining a passenger compartment, and a heating, ventilation and air conditioning (HVAC) system configured to provide heating and/or cooling to the passenger compartment. The HVAC system includes a refrigerant circuit including a compressor to urge a flow of refrigerant through the refrigerant circuit, a condenser heater, and an evaporator. One or more supply airflow inlets are configured to direct a supply airflow across one or more of the condenser heater and the evaporator, and one or more outlet ducts are configured to direct the supply airflow to the passenger compartment. An HVAC system controller is configured to operate the HVAC system in a heating mode to heat the supply airflow by directing the supply airflow across the condenser heater, and direct the heated supply airflow into the passenger compartment of the vehicle, and selectably direct a flow of refrigerant through the evaporator to reduce a relative humidity of the supply airflow by condensing excess moisture out of the supply airflow at the evaporator.

In addition to one or more of the features described herein the supply airflow is recirculated airflow from the passenger compartment.

In addition to one or more of the features described herein the HVAC system controller is further configured to open a fresh air duct to admit ambient air as a portion of the supply airflow, thereby removing accumulated moisture from the evaporator.

In addition to one or more of the features described herein the HVAC system controller is further configured to control operation of the evaporator to maintain an evaporator superheat greater than zero.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
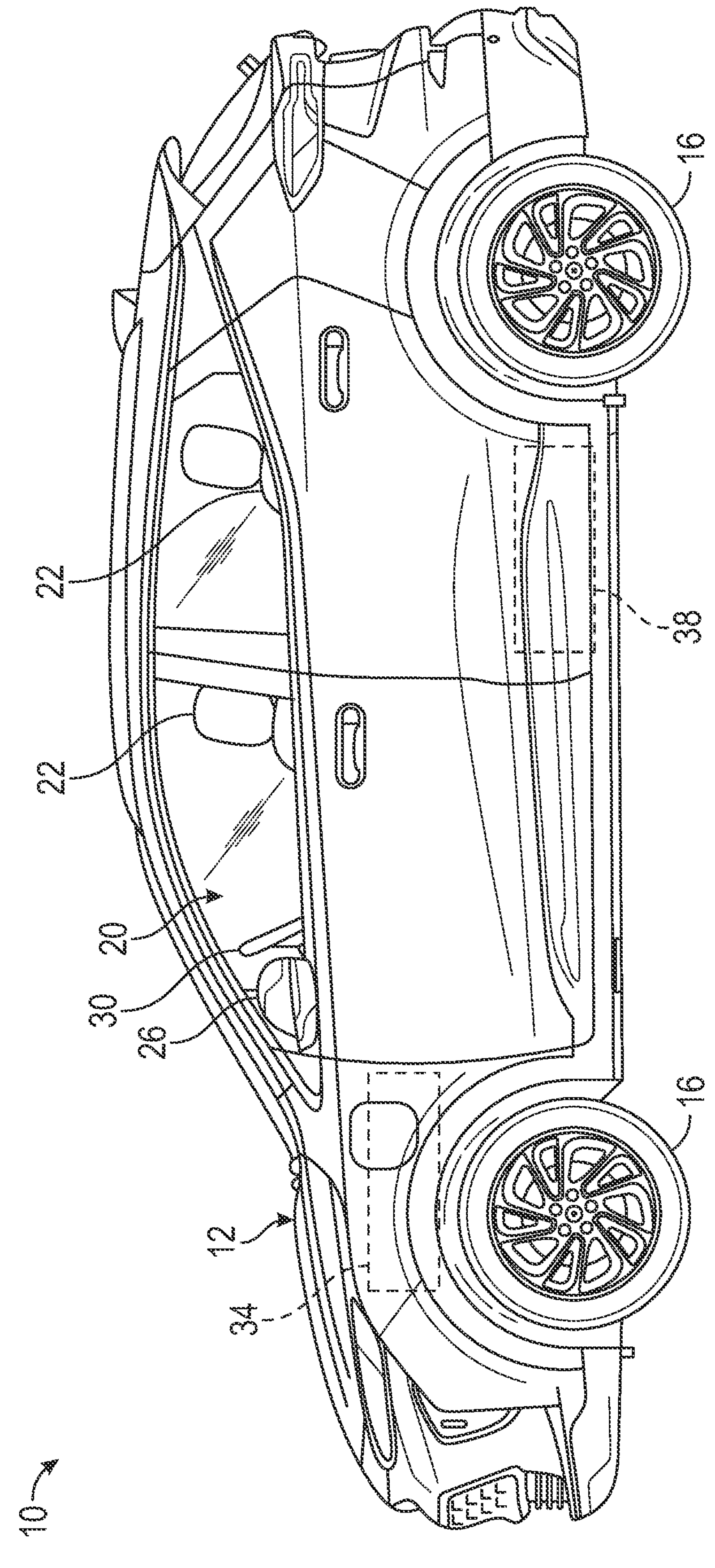
FIG. 1 is a schematic illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment a vehicle, in accordance with a non-limiting example, is indicated generally at 10 in FIG. 1. Vehicle 10 includes a body 12 supported on a plurality of wheels 16. In a non-limiting example, two of the plurality of wheels 16 are steerable. That is, changing a position of two of the plurality of wheels 16 relative to body 12 will cause vehicle 10 to change direction. Body 12 defines, in part, a passenger compartment 20 having seats 22 positioned behind a dashboard 26. A steering control 30 is arranged between seats 22 and dashboard 26. Steering control 30 is operated to control orientation of the steerable wheel(s). Vehicle 10 includes an electric motor 34 that provides power to one or more of the plurality of wheels 16. A rechargeable energy storage system (RESS) 38 or battery assembly provides power to electric motor 34.

Figure 2:
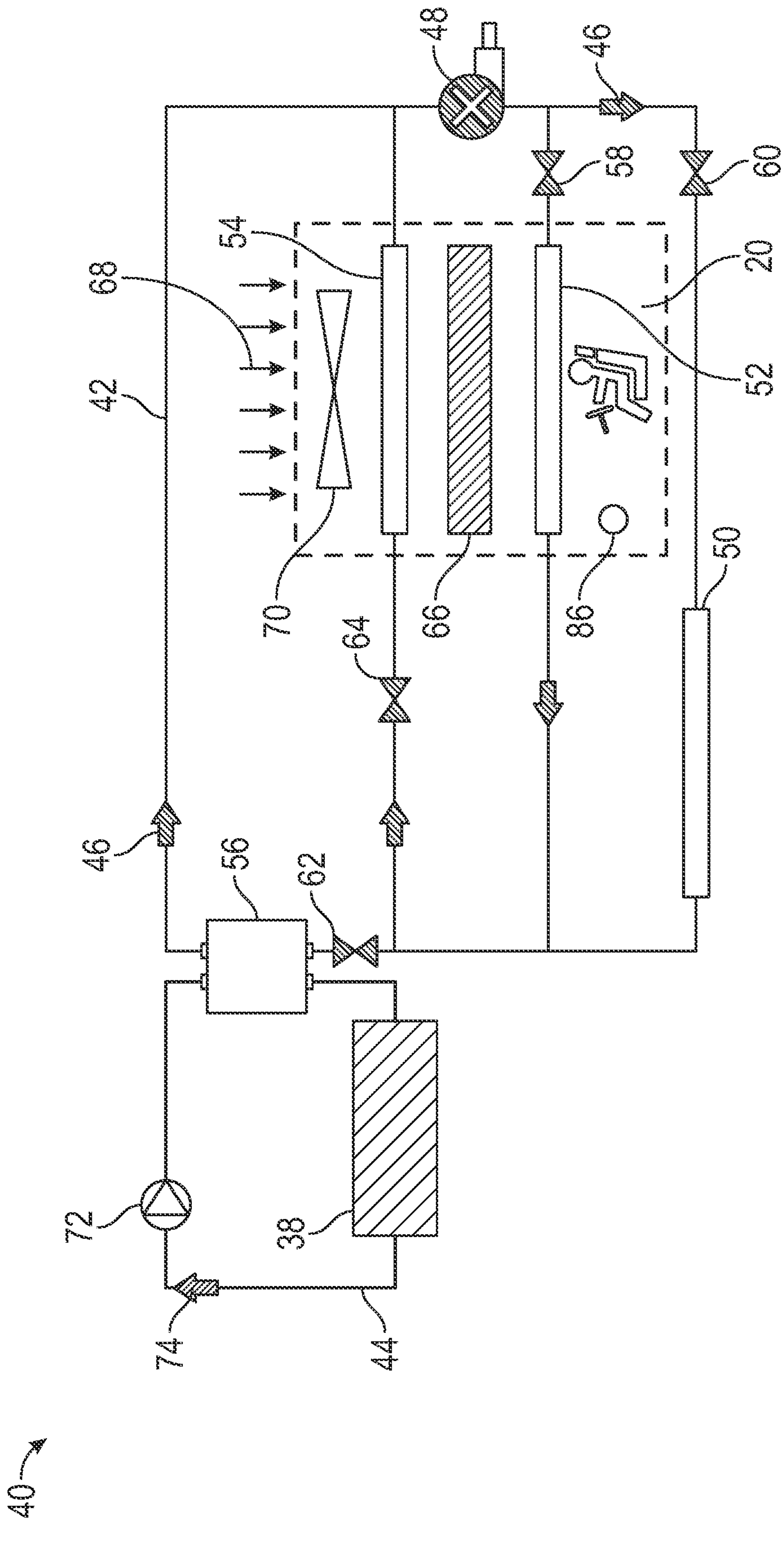
FIG. 2 is a schematic illustration of an embodiment of a heating, ventilation and air conditioning (HVAC) system of a vehicle.

Referring now to FIG. 2, a heating, ventilation and air conditioning (HVAC) system 40 is operably connected to the RESS 38 for thermal management of the RESS 38, and for thermal management of the passenger compartment 20. The HVAC system 40 includes a refrigerant circuit 42 and a coolant circuit 44, which are configured to exchange thermal energy between the refrigerant circuit 42 and the coolant circuit 44, and to condition the passenger compartment 20 and also to cool the RESS 38. The refrigerant circuit 42 includes a flow of refrigerant 46 circulating therethrough. The circulation of the flow of refrigerant 46 is driven by a compressor 48, with the refrigerant circuit 42 also including an outside condenser 50, a condenser heater 52 arranged in a fluidly parallel relationship, and an evaporator 54 and a chiller 56 arranged in a fluidly parallel relationship with each other. Condenser heater valve 58 and outside condenser valve 60 are positioned along the refrigerant circuit 42 to selectably direct the flow of refrigerant 46 through the condenser heater 52 and/or the outside condenser 50. Similarly, chiller valve 62 and evaporator expansion valve 64 are located along the refrigerant circuit 44 to selectably direct the flow of refrigerant 46 through the chiller 56 and/or the evaporator 54. The condenser heater 52 and the evaporator 54 selectably provide cooling airflow via the evaporator 54 or heating airflow via the condenser heater 52 to the passenger compartment 20 through an air door 66. To provide the cooling airflow or the heating airflow, a supply airflow 68 is urged across the evaporator 54 and/or the condenser heater 52 by a blower 70 and through the air door 66 into the passenger compartment 20.

The coolant circuit 44 includes coolant pump 72 to direct a flow of coolant 74 through the chiller 56, where the flow of coolant 74 exchanges thermal energy with the flow of refrigerant 46 to cool the flow of coolant 74. The flow of coolant 74 is directed to the RESS 38 to condition the RESS 38.

Figure 3:
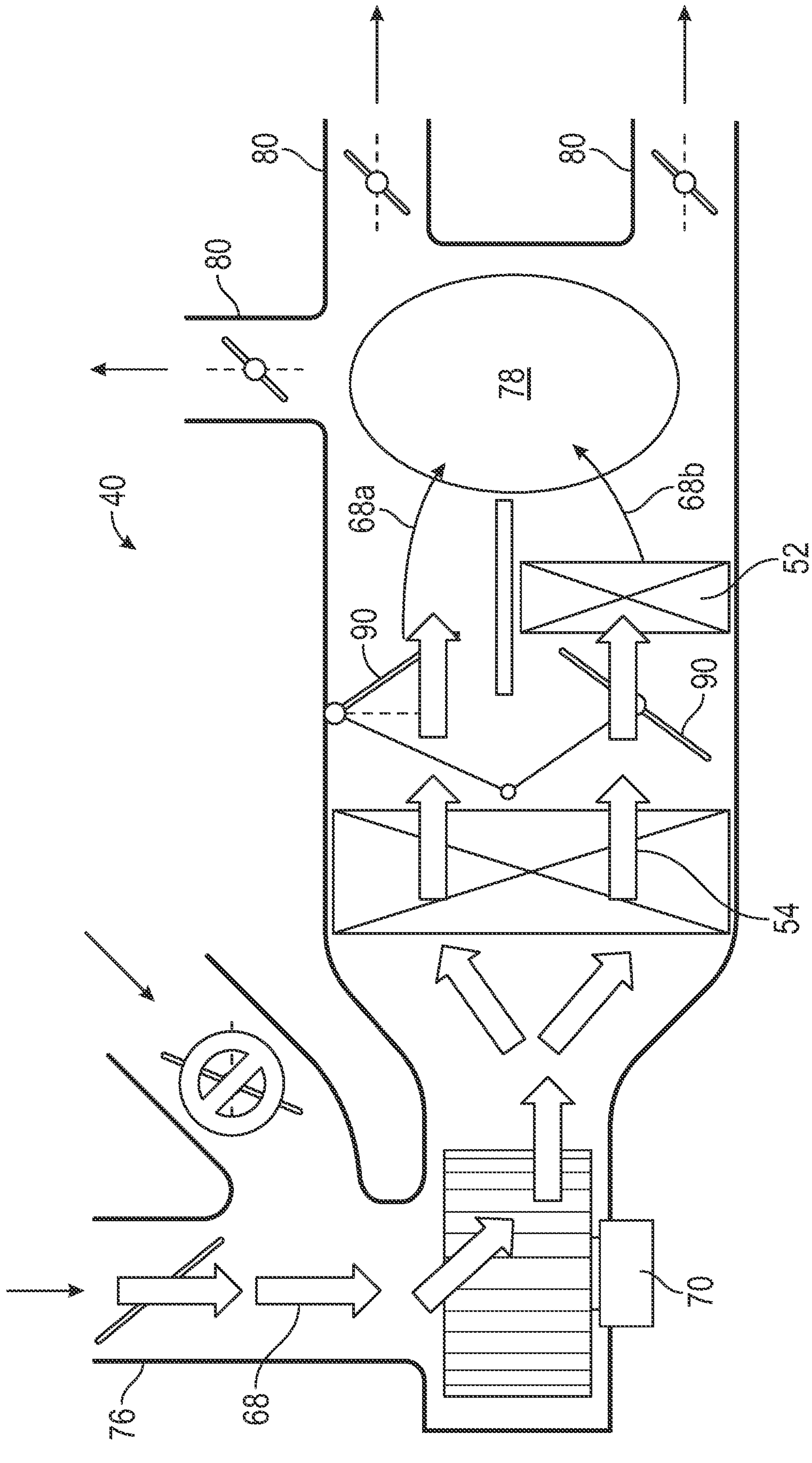
FIG. 3 is a schematic illustration of an embodiment of an HVAC system operating in a fresh air mode.
Figure 4:
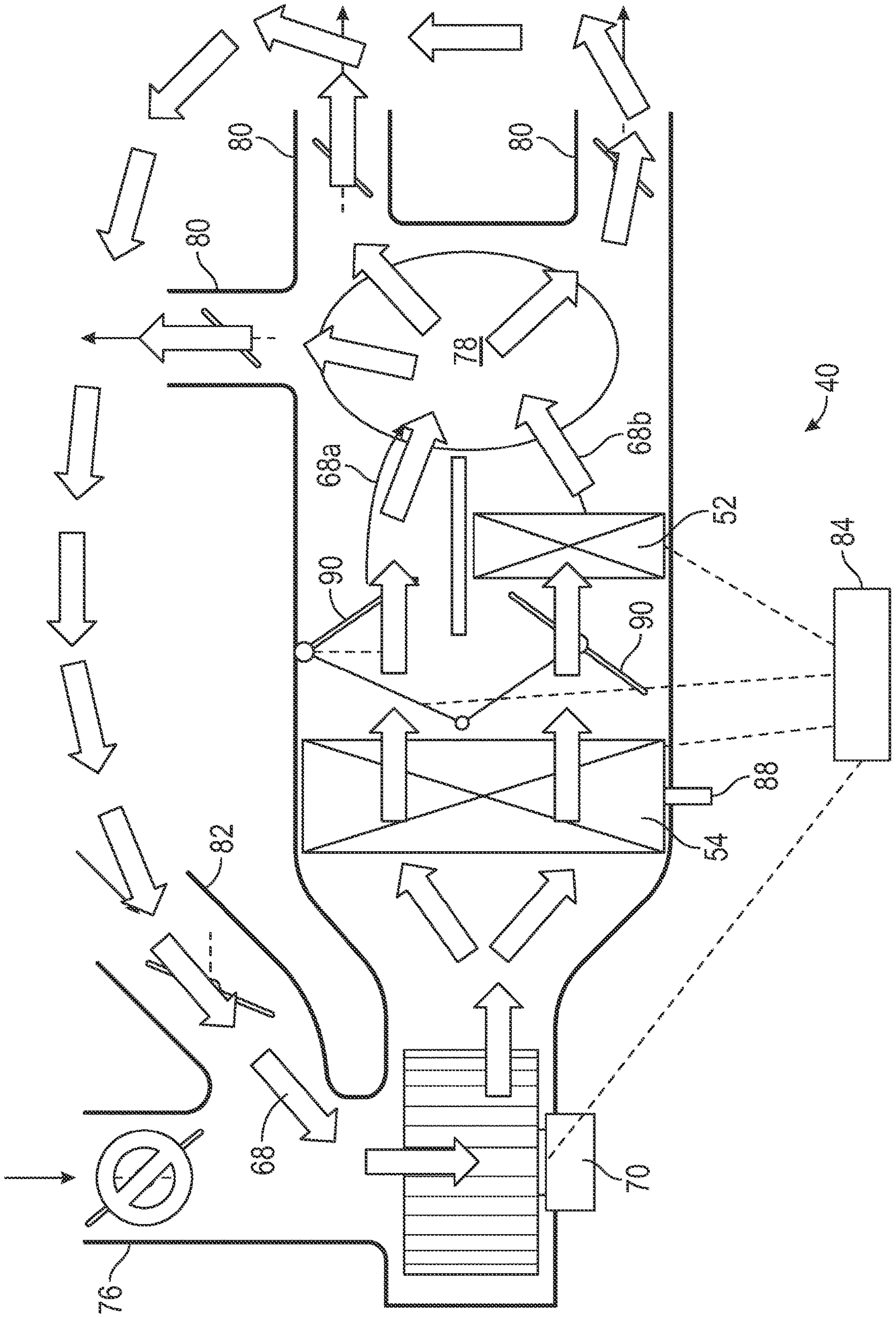
FIG. 4 is a schematic illustration of an embodiment of an HVAC system operating in a recirculated air mode.

Referring to FIGS. 3 and 4, the HVAC system 40 is operable in either a fresh air mode, illustrated in FIG. 3, or a recirculated air mode, as illustrated in FIG. 4. Referring first to FIG. 3, in the fresh air mode the supply airflow 68 is fresh air drawn from outside of the vehicle 10 through a fresh air duct 76. The blower 70 urges the supply airflow 68 across the evaporator 54. Downstream of the evaporator 54, a first airflow portion **68*a* may be directed to bypass the condenser heater 52, while a second airflow portion 68*b* may be directed across the condenser heater 52. The proportion of the first airflow portion 68*a* to the second airflow portion 68*b* depends on the airflow temperature selected to be output by the HVAC system 40, and is controlled via operation of mixing valves 90. The first airflow portion 68*a* and the second airflow portion 68*b* are mixed at a mixing chamber 78 and output into the passenger compartment 20 (shown in FIG. 2) via one or more outlet ducts 80**.

Referring now to FIG. 4, when operated in recirculated air mode the supply airflow 68 is recirculated airflow from the vehicle passenger compartment 20 through a recirculated air duct 82. The blower 70 urges the supply airflow 68 across the evaporator 54. Downstream of the evaporator 54, the first airflow portion **68*a* may be directed to bypass the condenser heater 52, while the second airflow portion 68*b* may be directed across the condenser heater 52. The proportion of the first airflow portion 68*a* to the second airflow portion 68*b* depends on the airflow temperature selected to be output by the HVAC system 40, and is controlled via operation of the mixing valves 90. The first airflow portion 68*a* and the second airflow portion 68*b* are mixed at the mixing chamber 78 and output into the passenger compartment 20 (shown in FIG. 2) via the one or more outlet ducts 80. The supply airflow 68 is then recirculated through the recirculated air duct 82**.

When heating of the passenger compartment 20 is requested, it is generally more efficient to operate the HVAC system 40 in recirculated air mode, especially when the ambient temperature is relatively low, such as below 40 degrees fahrenheit. This is because the recirculated air is warmer than the ambient air, so less heating of the supply air 68 is needed. Using recirculated air mode, however, typically increases relative humidity in the passenger compartment 20, increasing the occurrence of fogging of the vehicle windows.

Figure 5:
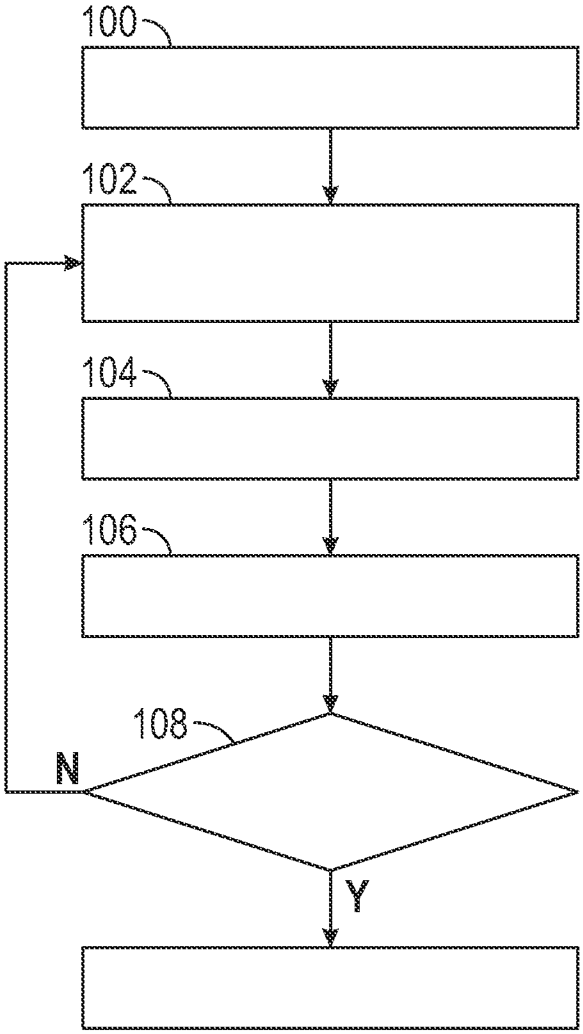
FIG. 5 is a schematic illustration of a method of operating an HVAC system of a vehicle.

To lower the relative humidity of the passenger compartment 20 while still operating in recirculated air mode, an HVAC system controller 84 (shown in FIG. 4), operates a humidity control method as illustrated in FIG. 5. To initiate the humidity control method, the HVAC system controller 84 checks that initial conditions for engagement of the method are met at step 100. The initial conditions include the following. The ambient air outside of the passenger compartment 20 must be cold enough to engage heating via the HVAC system 40. This temperature may be, for example, less than 40 degrees fahrenheit. Additionally, the HVAC system 40 must be set to operate in recirculated air mode. Also, the temperature of the supply airflow 68 must be high enough that the supply airflow 68 is cooled to a value above freezing when flowed across the evaporator 54. Finally, a dew point of the supply airflow 68 must be above freezing, so that water condensate does not freeze on the evaporator 54.

When these 4 conditions are met, the humidity is monitored via, for example a humidity sensor 86 (shown in FIG. 2), which is disposed in the passenger compartment 20 and detects both temperature and relative humidity of the passenger compartment. Dew point of the air in the passenger compartment 20 may be calculated from this detected temperature and relative humidity. If an increase in humidity is detected, a humidity control operation is initiated at step 102. More particularly, when humidity control is initiated, the evaporator expansion valve 64 is opened thus sending a flow of refrigerant through the evaporator 54. Operation of the evaporator thus condenses excess moisture out of the supply airflow 68. The excess moisture is collected at the evaporator 54 and drained from the HVAC system 40 by, for example, a drain 88 (shown in FIG. 4). The operation of the refrigerant circuit is controlled by operation of the evaporator expansion valve 64 to maintain evaporator superheat greater than zero, and to maintain a low side refrigerant pressure such that the saturation temperature is lower than the dew point of the supply airflow 68. Additionally, the chiller 56 is controlled, via operation of a chiller expansion valve 62, such that the chiller provides an elevated superheat to compensate for the lower evaporator superheat, and to maintain a low side refrigerant pressure such that the saturation temperature is lower than the dew point of the supply airflow 68. Also, the compressor 48 is operated to maintain sufficient passenger compartment 20 heating performance, to meet condenser heater 52 temperature targets.

After the humidity control operation is run for a preselected duration, the evaporator 54 is dried at step 104. This is achieved by switching the operating mode of the HVAC system 40 into a partial recirculation mode, so that at least a portion of the supply airflow 68 is fresh air admitted via the fresh air duct 76. A mixture of relatively cold, relatively dry outside air and recirculated relatively humid air, removes excess moisture from the evaporator 54 without freezing the water. Additionally, the evaporator expansion valve 64 is closed, stopping the flow of refrigerant through the evaporator 54. With the evaporator expansion valve 64 is closed and the operating mode set to partial recirculation, moisture is blown off of the evaporator 54 and proceeds along the drain 88. This will remove excess moisture off of the evaporator 54 and flush the excess moisture therefrom. At step 106, the relative humidity is again monitored, and if needed the humidity control operation may be repeated. If the humidity is sufficiently lowered, normal operation of the HVAC system 40 may be resumed at step 108. In some embodiments it is desired that the humidity be lowered to and maintained at a level low enough such that the dew point of the air in the passenger compartment 20 is at least 5 degrees Celsius lower than the detected temperature of the air in the passenger compartment 20.

Utilization of the humidity control operation allows for efficient operation of the HVAC system 40 using recirculated air mode, while preventing high relative humidity in the passenger compartment 20 which lower the occurrence of window fogging.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a heating, ventilation and air conditioning (HVAC) system of a vehicle, comprising:
- operating the HVAC system in a heating mode to heat a supply airflow and direct the heated supply airflow into a passenger compartment of the vehicle; and
- selectably directing a flow of refrigerant through an evaporator of the HVAC system to reduce a relative humidity of the supply airflow by condensing excess moisture out of the supply airflow at the evaporator;
- directing the flow of refrigerant through the evaporator while the supply airflow is recirculated into the HVAC system from the passenger compartment; and
- after directing the flow of refrigerant through the evaporator for a preselected duration, removing accumulated moisture from the evaporator by opening a fresh air duct to admit ambient air as a portion of the supply airflow, and stopping the flow of refrigerant through the evaporator.

2. The method of claim 1, further comprising controlling operation of the evaporator to maintain an evaporator superheat greater than zero.

3. The method of claim 1, further comprising monitoring the relative humidity and passenger compartment temperature via a humidity sensor.

4. The method of claim 1, further comprising stopping the flow of refrigerant through the evaporator when the relative humidity is below a selected threshold.

5. The method of claim 1, wherein an ambient temperature outside of the vehicle is less than 40 degrees Fahrenheit.

6. The method of claim 1, wherein a dew point of the supply airflow is greater than zero degrees Celsius.

7. A heating, ventilation and air conditioning (HVAC) system of a vehicle, comprising:
- a refrigerant circuit including:
  - a compressor to urge a flow of refrigerant through the refrigerant circuit;
  - a condenser heater;
  - an evaporator;
  - one or more supply airflow inlets configured to direct a supply airflow across one or more of the condenser heater and the evaporator;
  - one or more outlet ducts configured to direct the supply airflow to a passenger compartment of the vehicle; and an HVAC system controller configured to:
operate the HVAC system in a heating mode to heat the supply airflow by directing the supply airflow across the condenser heater, and direct the heated supply airflow into the passenger compartment of the vehicle; and
selectably direct a flow of refrigerant through the evaporator to reduce a relative humidity of the supply airflow by condensing excess moisture out of the supply airflow at the evaporator;
wherein the flow of refrigerant is directed through the evaporator while the supply airflow is recirculated into the HVAC system from the passenger compartment; and
wherein after directing the flow of refrigerant through the evaporator for a preselected duration, removing accumulated moisture from the evaporator by opening a fresh air duct to admit ambient air as a portion of the supply airflow, and stopping the flow of refrigerant through the evaporator.

8. The HVAC system of claim 7, wherein the HVAC system controller is further configured to control operation of the evaporator to maintain an evaporator superheat greater than zero.

9. The HVAC system of claim 7, wherein the HVAC system controller is further configured to stop directing the flow of refrigerant through the evaporator when the relative humidity is below a selected threshold.

10. The HVAC system of claim 7, further comprising a blower configured to urge the supply airflow through the HVAC system.

11. The HVAC system of claim 7, further comprising a coolant circuit having a flow of coolant therethrough and thermally connected to the refrigerant circuit via a chiller.

12. The HVAC system of claim 11, wherein the flow of coolant is configured to cool a rechargeable energy storage system of the vehicle.

13. A vehicle, comprising:
a vehicle body defining a passenger compartment; and
a heating, ventilation and air conditioning (HVAC) system configured to provide heating and/or cooling to the passenger compartment, including:
a refrigerant circuit including:
a compressor to urge a flow of refrigerant through the refrigerant circuit;
a condenser heater; and
an evaporator;
one or more supply airflow inlets configured to direct a supply airflow across one or more of the condenser heater and the evaporator;
one or more outlet ducts configured to direct the supply airflow to the passenger compartment; and
an HVAC system controller configured to:
operate the HVAC system in a heating mode to heat the supply airflow by directing the supply airflow across the condenser heater, and direct the heated supply airflow into the passenger compartment of the vehicle; and
selectably direct a flow of refrigerant through the evaporator to reduce a relative humidity of the supply airflow by condensing excess moisture out of the supply airflow at the evaporator;
wherein the flow of refrigerant is directed through the evaporator while the supply airflow is recirculated into the HVAC system from the passenger compartment; and
wherein after directing the flow of refrigerant through the evaporator for a preselected duration, removing accumulated moisture from the evaporator by opening a fresh air duct to admit ambient air as a portion of the supply airflow, and stopping the flow of refrigerant through the evaporator.

14. The vehicle of claim 13, wherein the HVAC system controller is further configured to control operation of the evaporator to maintain an evaporator superheat greater than zero.

* * * * *